United States Patent [19]
Skinner et al.

[11] 3,923,387
[45] Dec. 2, 1975

[54] MOTION PICTURE VIEWER WITH REMOVABLE CARTRIDGE

[75] Inventors: James R. Skinner, Cupertino; Mark O. Uitz, Mountain View; Paul W. Hait, Saratoga, all of Calif.

[73] Assignee: F. J. L. Corporation, Mountain View, Calif.

[22] Filed: Feb. 22, 1974

[21] Appl. No.: 444,978

Related U.S. Application Data

[60] Division of Ser. No. 338,893, March 7, 1973, which is a continuation of Ser. No. 78,115, Oct. 5, 1970, abandoned, which is a continuation-in-part of Ser. No. 867,289, Oct. 17, 1969.

[52] U.S. Cl. ............... 352/78 R; 352/129; 352/173
[51] Int. Cl.² ...................... G03B 23/04; G03B 1/16
[58] Field of Search ............ 352/78 R, 72, 129, 173

[56] References Cited
UNITED STATES PATENTS

| | | | |
|---|---|---|---|
| 1,372,675 | 3/1921 | Davis | 352/72 |
| 2,476,705 | 7/1949 | Coutant et al. | 352/78 R |
| 3,706,439 | 12/1972 | Skinner et al. | 352/78 R |

Primary Examiner—Samuel S. Matthews
Assistant Examiner—Russell E. Adams, Jr.
Attorney, Agent, or Firm—Flehr, Hohbach, Test, Albritton & Herbert

[57] ABSTRACT

Motion picture viewer with removable cartridge having a housing with a cartridge removably mounted in the housing. An aperture is provided in the cartridge. A length of film is disposed within the cartridge and means is provided for advancing the length of film frame by frame past the aperture. Means is mounted in the cartridge and exposed to a source of light for supplying light to the film on the side of the film opposite the aperture. An eye piece is mounted on the housing in front of the aperture to permit viewing of the film as it is advanced in the cartridge.

5 Claims, 34 Drawing Figures

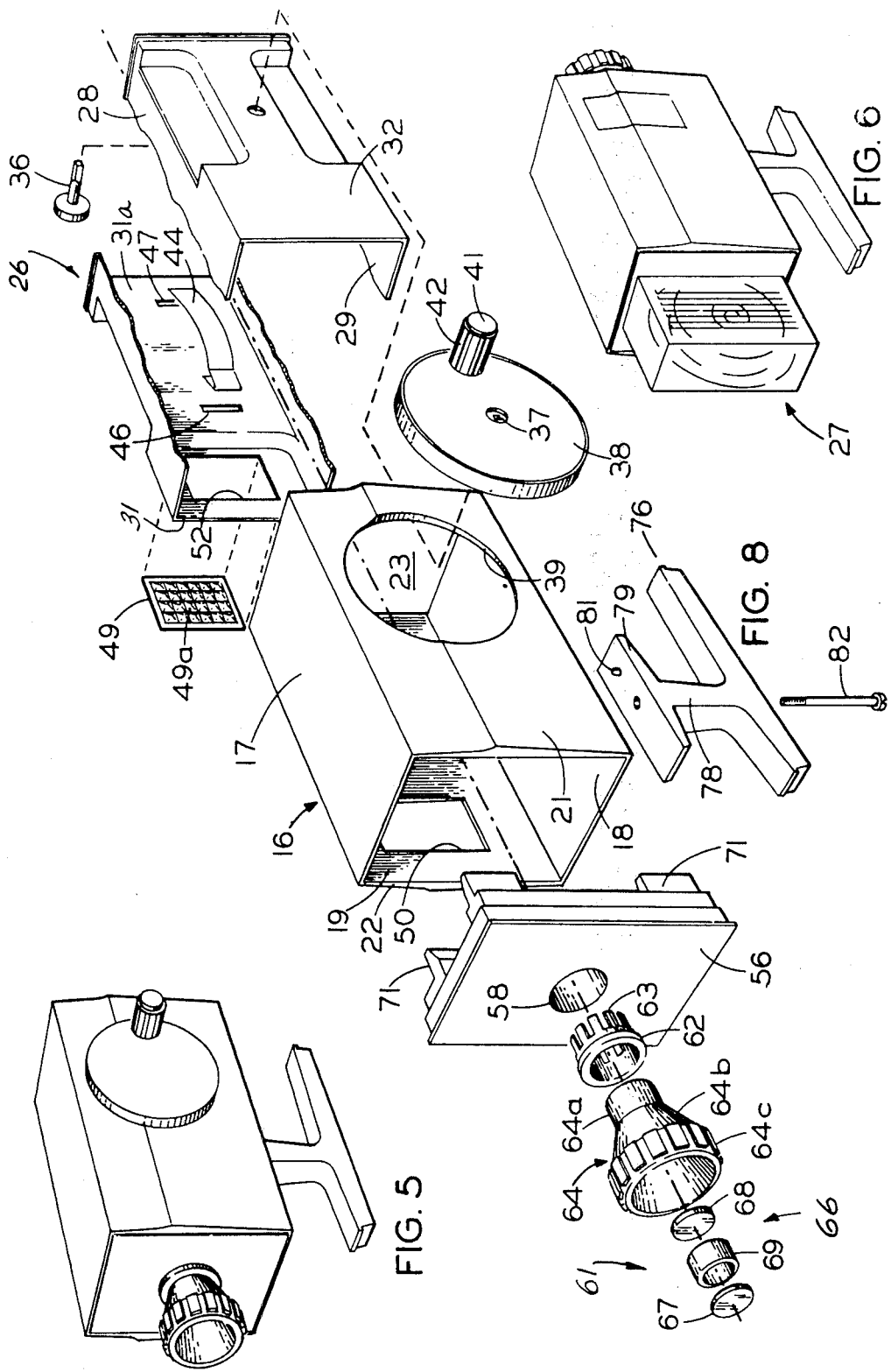

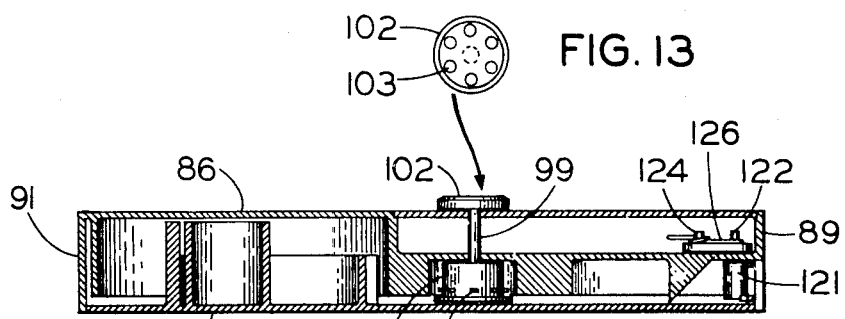
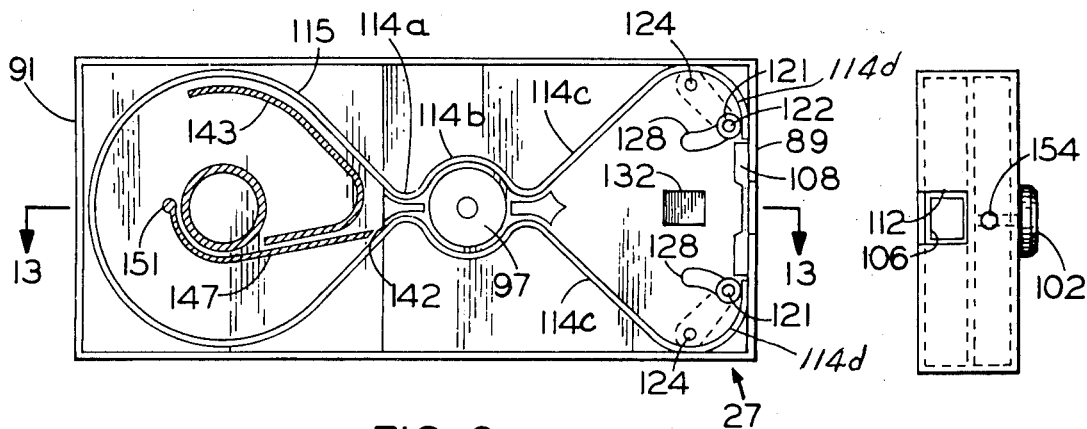
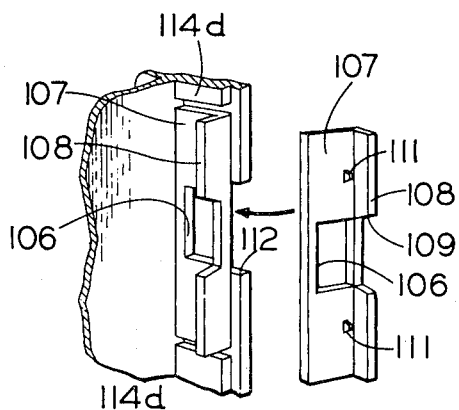

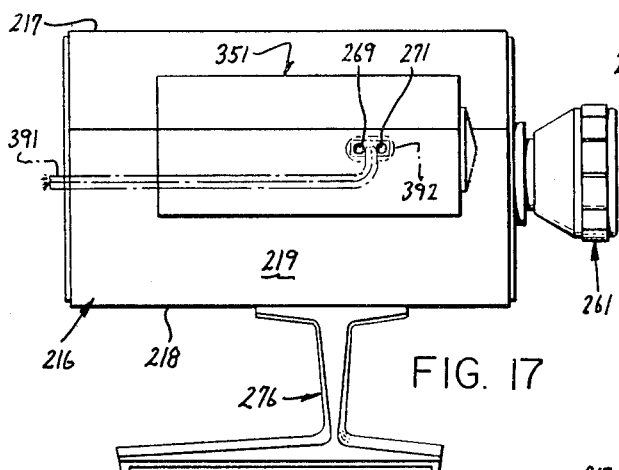
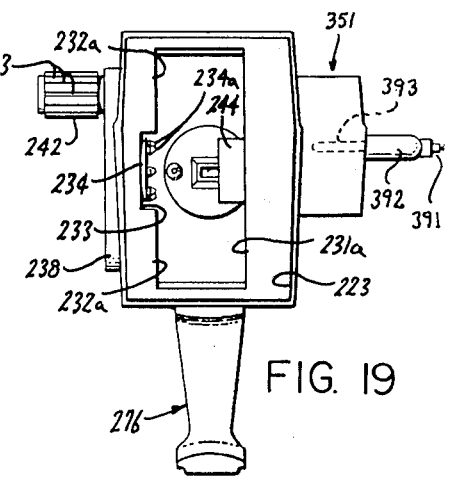
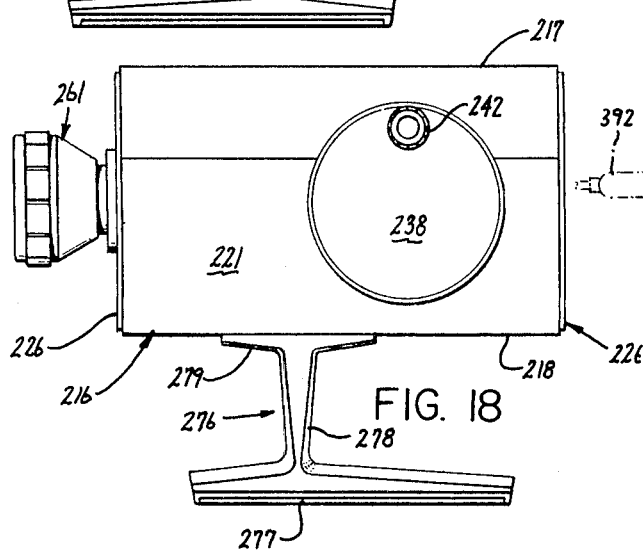
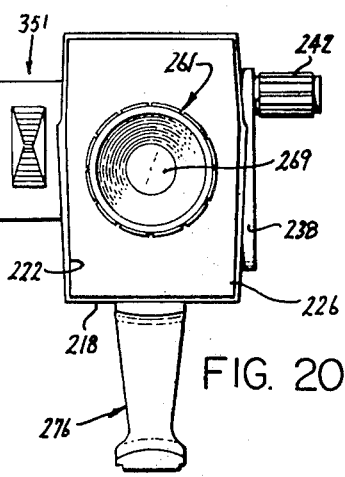
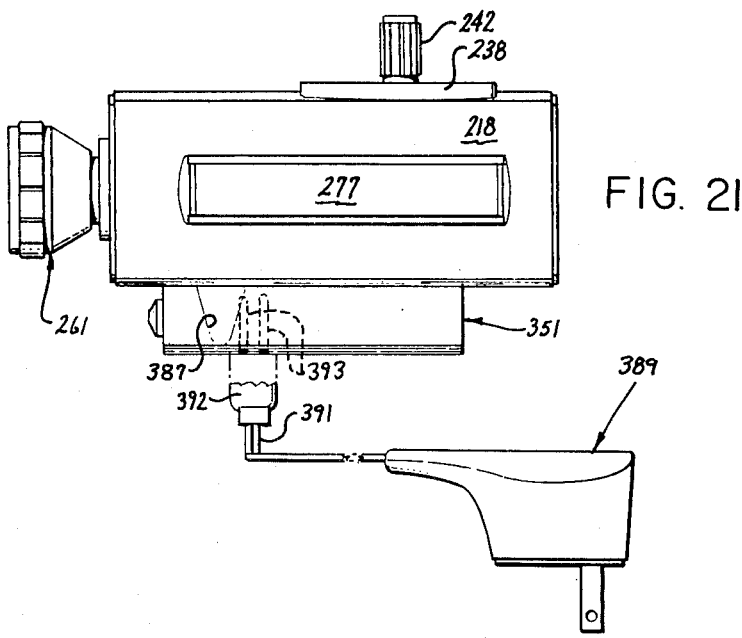

MOTION PICTURE VIEWER WITH REMOVABLE CARTRIDGE

CROSS-REFERENCE TO RELATED APPLICATION

This is a division, of application Ser. No. 338,893 filed Mar. 7, 1973 which application is a continuation of Ser. No. 78,115, filed Oct. 5, 1970, now abandoned, which was a continuatin-in-part of Ser. No. 867,289, filed Oct. 17, 1969.

BACKGROUND OF THE INVENTION

1. Field of the Invention

This invention relates to motion picutre viewers and removable cartridges for use therewith. 2. Description of the Prior Art Hand-held manually operated motion picture viewers have heretofore been provided. However, such viewers have had a number of disadvantages. For example, they have been noisy in operation. They have been unreliable in operation and, in addition, they have been relatively expensive to product. In addition, such motion picture viewers have not been usable where there has been insufficient ambient light. There is, therefore, a need for a new and improved motion picture viewer which will overcome the above named disadvantages.

SUMMARY OF THE INVENTION AND OBJECTS

The motion picture viewer consists of a housing. A cartridge is removably mounted in the housing. The cartridge is formed with an aperture. A length of film is disposed in the cartridge and means is provided for advancing the film frame by frame past the aperture. Means is mounted in the aperture and exposed to a source of light for supplying light to the film on the side opposite the aperture. An eye piece is mounted in the housing in front of the aperture in the cartridge to permit viewing of the film as it is advanced. The means for advancing the film is formed so that the film can be advanced in either of two directions.

In general, it is an object of the present invention to provide a motion picture viewer with a removable cartridge which can be inexpensively produced.

Another object of the invention is to provide a motion picture viewer with removable cartridge of the above type which is relatively quiet in operation.

Another object of the invention is to provide a motion picture viewer with removable cartridge in which the viewer can be held by one hand and operated by the other hand and still provide good motion pictures.

Another object of the invention is to provide a motion picture viewer with removable cartridge of the above character which utilizes ambient light.

Another object of the invention is to provide a motion picture viewer which includes a source of light which can be utilized when there is insufficient ambient light.

Another object of the invention is to provide a motion picture viewer of the above character in which a battery or 110 VAC power supply is used as a source of power for the light.

Additional objects and features of the invention will appear from the following description in which the preferred embodiments are set forth in detail in conjunction with the accompanying drawing.

BRIEF DESCRIPTION OF THE DRAWING

FIG. 5 is a perspective view of the motion picture viewer.

FIG. 6 is another perspective view of the motion picture viewer shown with the removable cartridge in place.

FIG. 8 is an exploded view of the motion picture viewer.

FIG. 9 is a side elevational view of a cartridge incorporating the present invention.

FIG. 10 is a top plan view of the cartridge shown in FIG. 9.

FIG. 11 is a front elevational view of the cartridge shown in FIG. 9.

FIG. 13 is a side elevational view of the driven member used in the cartridge.

FIG. 14 is a partial perspective view of the front end of the cartridge.

FIG. 15 is a perspective view of the film guide member shown in FIG. 14.

FIG. 17 is a side elevational view of another embodiment of a motion picture viewer incorporating the present invention and showing the power pack for recharging the battery for the light source.

FIG. 18 is a side elevational view of the motion picture viewer opposite the side shown in FIG. 17.

FIG. 19 is a rear elevational view of the motion picture viewer shown in FIGS. 17 and 18.

FIG. 20 is a front elevational view of the motion picture viewer shown in FIGS. 17 and 18.

FIG. 21 is a bottom plan view of the motion picture viewer shown in FIGS. 17 and 18.

DESCRIPTION OF THE PREFERRED EMBODIMENTS

Figures 1, 3:
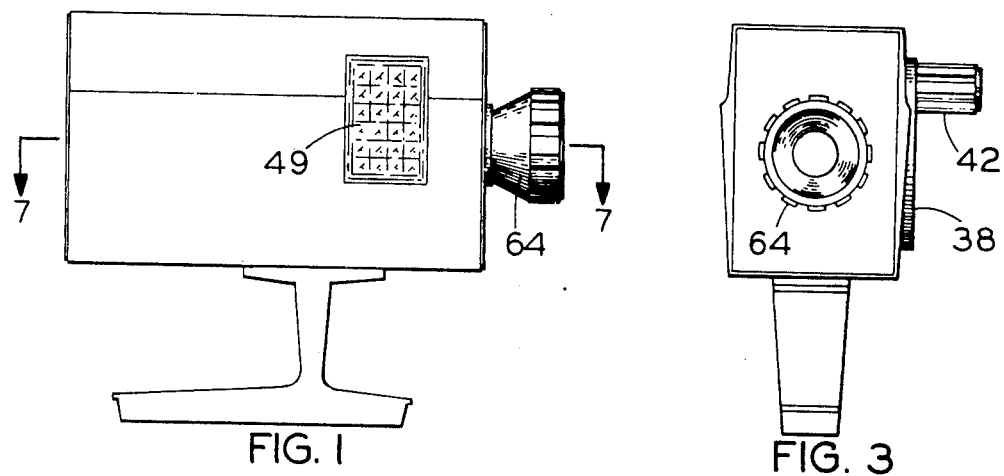
FIG. 1 is a side elevational view of a motion picture viewer incorporating the present invention.
FIG. 3 is a front elevational view of the motion picture viewer.
Figures 2, 4:
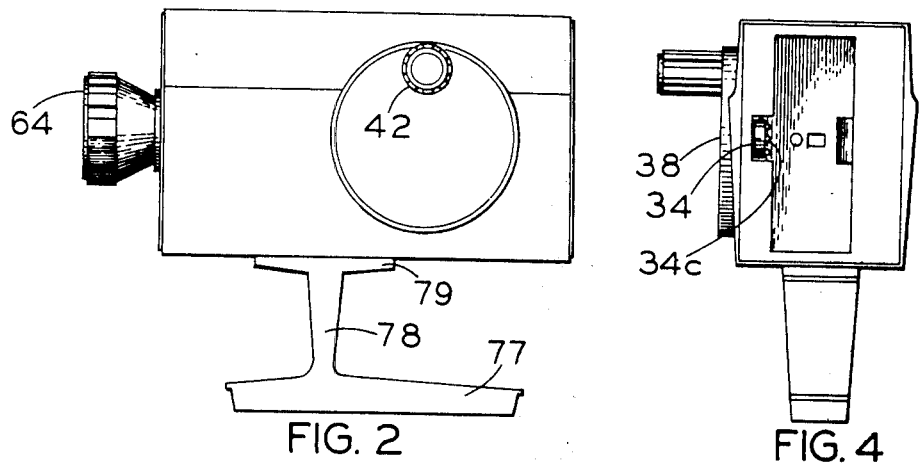
FIG. 2 is a side elevational view of the motion picture viewer opposite the side show in FIG. 1.
FIG. 4 is a rear elevational view of the motion picture viewer.
Figure 7:
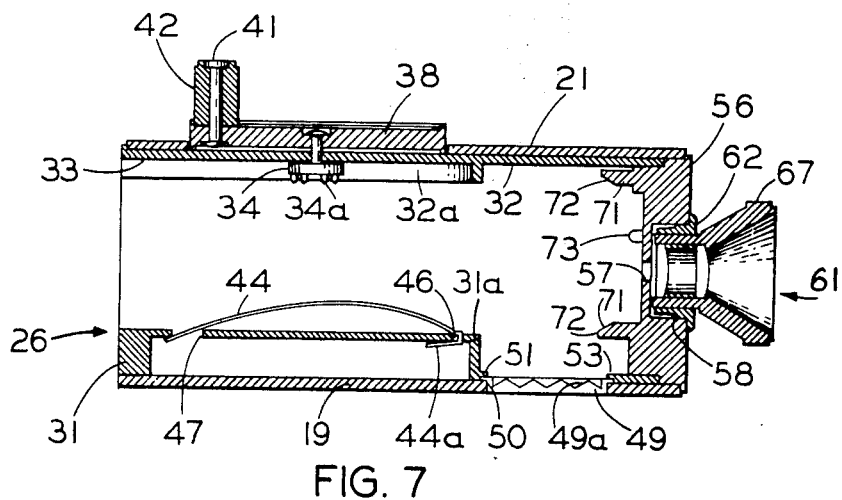
FIG. 7 is a cross-sectional view taken along the line 7—7 of FIG. 1.

The motion picture viewer consists of a housing 16 which is generally rectangular in shape as shown in FIGS. 1–8. The housing 16 is formed of suitable material such as an aluminum extrusion. The housing consists of top and bottom walls 17 and 18, side walls 19 and 21, and front and rear open ends 22 and 23. A one-piece inner case 26 formed of a suitable material such as plastic is disposed within the housing 16. The inner case 26 is adapted to receive a film magazine or cartridge 27 hereinafter described in detail. The inner case is provided with a top wall 28, a bottom wall 29 and side walls 31 and 32. The side wall 31 is provided with an inwardly extending raised portion 31a (see FIGS. 7 and 8) which extends longitudinally of the inner case 26. The side wall 32 is provided with inwardly extending upper and lower portions 32a between which there is formed a longitudinally extending recess 33.

A disc-like drive member 34 is disposed within the recess 33 and is provided with integral, outwardly extending drive lugs or pins 34a which are spaced in a circle adjacent the outer margin of one side of the drive member 34. The drive member 34 is provided with an integral shaft 36 which is squared on its outermost end. The shaft 36 extends through the side wall 32 of the inner case 26 and extends into a square hole 37 provided in a crank disc 38. The disc 38 is disposed within a circular opening or hole 39 provided in the housing 16. A pin 41 is mounted adjacent the outer margin of the wheel 38 and extends outwardly therefrom. A sleeve 42 is mounted on the pin. It can be seen that the sleeve 42 and the pin 41 serve as a handle which, in combination with the disc 38, serve as crank means for rotating the drive member 34.

Spring means is provided for yieldably engaging the firm cartridge or magazine 27 and urging it into engagement with the drive member 34 and consists of a metal leaf spring 44 which has one end portion 44a turned over to form a clip which extends through a hole 46 provided in the side wall 31. The other end of the leaf spring 44 extends through a wide opening 47 provided in the side wall 31.

A diffuser window 49 for admitting ambient light is formed of a suitable material such as plastic and is mounted in an opening 50 in side wall 22 of the housing 16. The window 49 is provided with a plurality of prism portions 49a of a type well known to those skilled in the art. The diffuser window 49 is provided with flanges 51 which extend over the side wall 22 and serve to prevent the window from falling outwardly through the opening 50. The window 49 is also in registration with an opening 52 in the side wall 31 of the inner case 26. The rear sides of the flanges 51 of the window 49 are engaged by flanges 53 provided on the inner case 26 (see FIG. 7).

A front mounting plate 56 is mounted in the front opening 22 of the housing 16. The front mounting plate is formed of a suitable material such as plastic and is provided with a viewing aperture 57 which opens into a cylindrival bore 58 also provided in the front mounting plate. An eye piece assembly 61 is mounted in the bore 58. The eye piece assembly 61 consists of a ring 62 which is provided with a plurality of spaced fingers which are adapted to frictionally engage the annular surface forming the bore 58. The ring 62 is adapted to receive a cylindrical portion 64a of an eye piece 64. A lens assembly 66 is mounted in the cylindrical portion 64a. The lens assembly consists of a pair of plano convex plastic lenses 67 and 68 which are separated by a spacer 69. The eye piece 64 is provided with a cone-shaped portion 64b and a knurled cylindrical portion 64c. By positioning the eye piece 64 within the ring 62, it is possible to focus the eye piece assembly 61 relative to the film to be viewed as hereinafter described.

The front mounting plate 56 is provided with integral spaced ears 71. As can be seen particularly from FIGS. 7 and 8, two pairs of ears are spaced on opposite sides of the aperture 57 and are also spaced at the top and bottom of the mounting plate. The ears 71 are provided with inclined surfaces 72 which facilitate positioning of the magazine or cartridge 27. In addition, a locating pin 73 is mounted on the mounting plate adjacent the aperture 57 and is adapted to be engaged by the magazine or cartridge 27 to precisely position the same.

In assembling the viewer, the inner case 26 is slipped into the rear open end 23 of the housing 16 and the mounting plate 56 is pressed into the front open end 22 of the housing 16. The inner case 26 and the mounting plate 56 then can be fastened together in a suitable manner such as by the use of cement so that they are retained within the housing.

A combination stand and hand grip 76 is mounted upon the housing 16 and is provided with an elongate base 77, a vertical pedestal 78 and a mounting block 79 which is secured to the pedestal. The stand 76 can be formed of a suitable material such as an aluminum extrusion. A locating pin 81 is provided in the mounting block 79 and is adapted to engage a hole (not shown) in the housing 16. A screw 82 which is countersunk in and extends through the stand is threaded into the housing 16.

The film cartridge or magazine 27 is formed of a suitable material such as plastic and is provided with a rear wall 86, top and bottom walls 87 and 88, and front and rear walls 89 and 91. A front cover 92 is provided and has ears 93 at one end which are adapted to seat within slots 94 provided in the front wall 89. Ears 93 are also provided on the other end of the front cover and are adapted to engage slots (not shown) in the rear wall 91 similar to the slots 94.

A length of film 96 is disposed within the cartridge 27. In the embodiment of the cartridge shown, the length of film 96 takes the form of a continuous loop. However, it should be appreciated that the principles of the present invention can be utilized in conjunction with a non-continuous loop with the use of separate supply and take-up reels. The length of film 96 is of a conventional type and is provided with a plurality of perforations 95 extending longitudinally of the film along one side of the film. The film 96 is adapted to be engaged by a sprocket 97. The sprocket 97 is provided with teeth 98 which are adapted to engage the perforations 95 in the film. The sprocket 97 is mounted on a shaft 99 which is mounted in a wall 101 parallel to the rear wall 86 and spaced therefrom. The shaft 99 also extends through the wall 86 and has secured thereto a driven circular disc 102. The driven disc 102 is provided with a plurality of recesses 103 spaced in a circle and adjacent the outer margin of the outer surface of the driven circular disc 102.

The film 96 is to be moved past an aperture 106 provided in an index plate 107 which is secured to the front wall 89 of the cartridge by suitable means such as cement. The index plate 107 is provided with a rearwardly extending film guide or flange 108 which is adapted to guide one edge of the film as it passes the aperture. The guide flange 108 is provided with a slot 109 in alignment with the aperture 106. Means is provided for arresting the film during its travel past the aperture and consists of a pair of triangularly shaped pins 111 mounted above and below the aperature 106 adjacent the guide flange 108. The aperture 106 is positioned so that it will be in registration with the aperture 57 provided in the front mounting plate of the housing 16 when the cartridge is inserted in the housing. The front wall 89 is also provided with an opening 112 which is slightly larger than the aperture 106 and in general registration with the aperture.

Upper and lower film guide members 114 are provided. The guide members 114 are formed integral with a generally circular film storage guide member 115. These guide members 114 and 115 are secured to the wall 101. At the entrance to the sprocket 97, the film guide members 114 are provided with outwardly turned portion 114a between which there is provided a separator 116 which can be designated as the rear separator because it is positioned immediately adjacent the sprocket 97 to the rear of the same. The film guide members 114 are also provided with curved portions 114b which are adapted to lie in relatively close proximity to the upper and bottom sides of the sprocket 97. The film guide members 114 are also provided with outwardly extending portions 114c and downwardly extending portions 114d. The portions 114d terminate immediately adjacent the upper and lower extremities of the index plate 107. A front separator 117 is provided between the film guide members 114 for keeping the upper and lower runs of the film separate.

Figure 12:
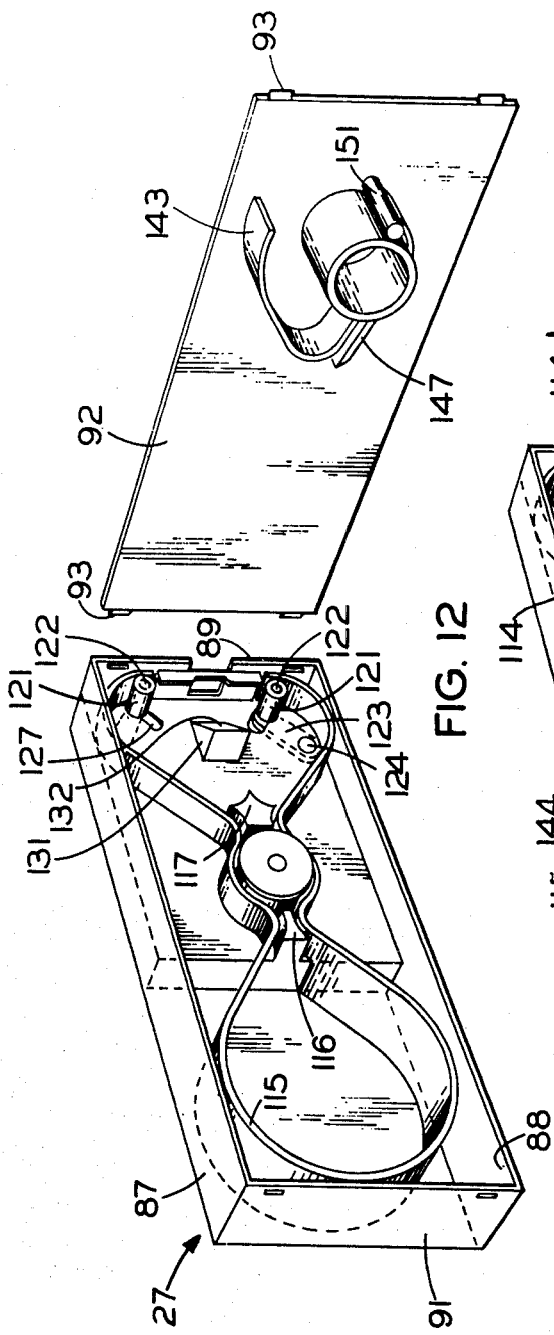
FIG. 12. is a perspective view showing the cartridge with the front cover in an open position.

Means is provided for retaining the film 96 in relatively close proximity to the index plate and the aperture 106 of the index plate and consists of a pair of rollers 121 positioned above and below the index plate. The rollers 121 are mounted upon pins 122 carried by arms 123. The arms 123 are pivotally mounted on pins 124 secured to the plate 101. Springs 126 have one end engaging the pin 122 and the other end engaging the pin 124 and yieldably urge the rollers into engagement with the film 96. As can be seen, particularly from FIG. 12, the pins 122 extend through arcuate slots 127 provided in the side wall 101.

Means is provided for utilizing light admitted into the motion picuture viewer by the window 49 and carrying it to a point immediately behind the film in the aperture. This means consists of a triangular block 131 which is secured to the wall 101. A reflecting surface 132 is provided on the triangular block 131. The surface 132 generally extends at an angle of 45° with respect to the film and to the window 49.

The storage guide member 115 cooperates with film guiding means carried by one end of the front cover 92. This film guiding means takes the form of a generally J-shaped guide member 143 which has the bottom of the J facing through an opening 142 provided in the circular guide member 115. This J-shaped member in cooperation with the guide member 115 forms an elongate slot 144 through which the film travels after it is separated from the outside of the roll of film loosely wound on a central fixed spool or cylinder 146 mounted on the cover 92. In addition, there is provided an elongate guide member 147 which is positioned adjacent the end of the guide member 143 and cooperates with the guide member 143 to provide a slot 148 for travel of the film 96. The guide member 147 is curved at its innermost end and forms in cooperation with the cylinder 146 an arcuate slop 149 through which the film 96 passes to be wound or unwound from the center of the roll of film. The curved end of the guide member 147 is mounted on a cylindrical pin 151 mounted on the cover 92.

A hole 154 is provided in the front wall 89 of the cartridge which is adapted to receive the registration pin 73 provided on the mounting plate 56.

Figure 16:
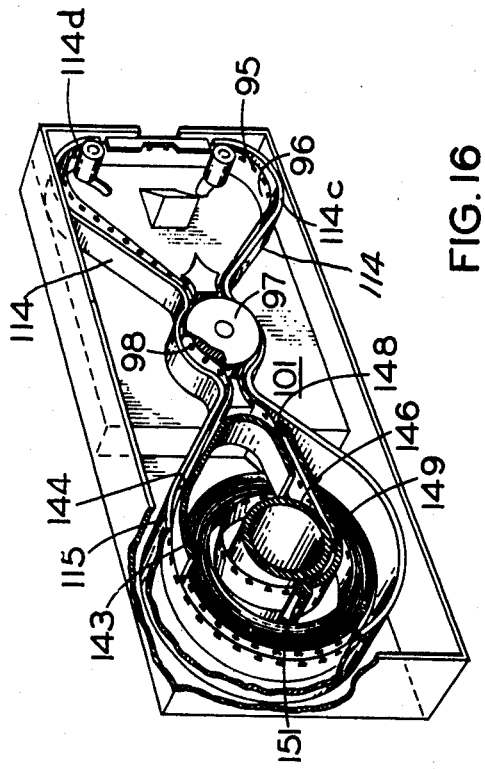
FIG. 16 is a perspective view of the cartridge with movie film in place.
Figure 22:
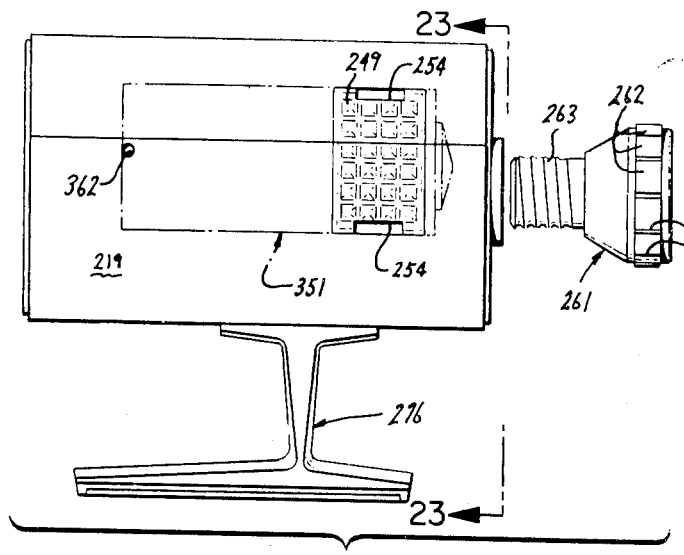
FIG. 22 is a side elevational view similar to the view shown in FIG. 17 with the light source pack removed and showing its dimensions in broken lines.
Figure 23:
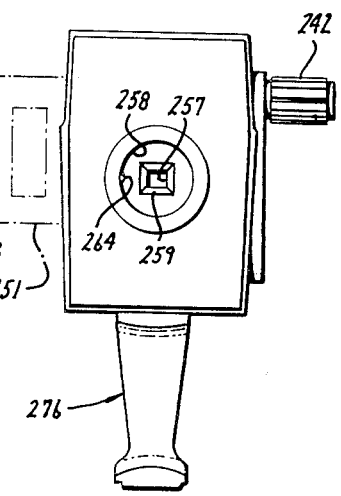
FIG. 23 is a rear elevational view of the motion picture viewer shown in FIG. 22.
Figure 29:
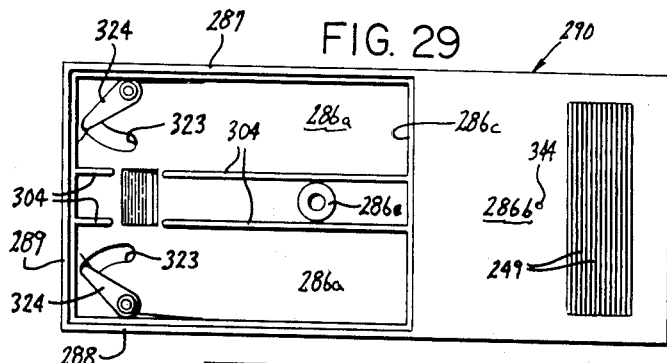
FIG. 29 is a side elevational view of the cartridge with the cover removed.
Figure 30:
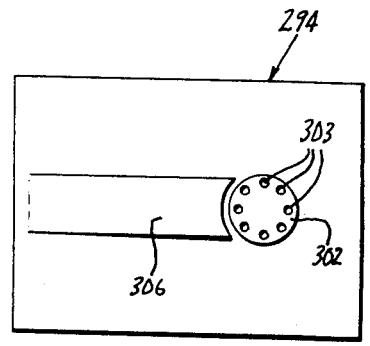
FIG. 30 is a side elevational view of the cover which has been removed from the cartridge shown in FIG. 29.
Figure 25:
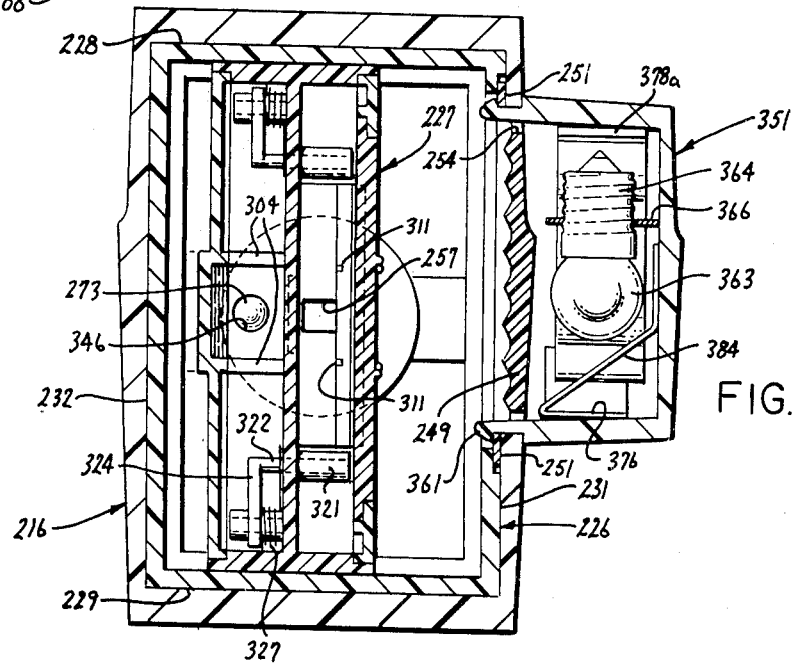
FIG. 25 is a cross-sectional view taken along the line 25—25 of FIG. 24.

Operation and use of the motion picture viewer with a removable cartridge or magazine may now be briefly described as follows, Let it be assumed that a continuous length of film 96 has been mounted within the cartridge in which most of the film is in the roll. The film 96 is positioned as shown in FIG. 16 and can be payed off from either the outside or the inside of the roll. The film 96 is also threaded over and under the sprocket 97 and is positioned behind the rollers 121 against the index plate 107 so that the film is in position for viewing through the viewing aperture. After the film 96 has been properly threaded, the cover 92 can be closed.

After the magazine or cartridge 27 has been loaded, it can be readily loaded into the motion picture viewer merely by inserting it through the back opening of the viewer. The cartridge is precisely positioned in the viewer by the ears 72 and finally by the locating pin 73. The locating pin 73 enters the hole 146 to precisely position the magazine or cartridge 27 so that the aperture 106 is in registration with the aperture 57 provided in the mounting plate 56 secured to the housing 16.

At the same time that the magazine is being pushed in place, the drive member 34 carried by the viewer and the driven member 102 carried by the magazine are automatically moved into registration with each other. The spring 44 ensures that the cartridge with the driven member 102 is firmly urged against the drive member 34.

As soon as this has been accomplished, the operator grasps the stand 76 by the left hand and then engages the handle 42 with the other hand and rotates it either in a clockwise or counter-clockwise direction. At the same time, the operator places one of his eyes against the eye piece 64. Rotation of the handle 42 will cause rotation of the driven member 102 and the sprocket 97 secured thereto. Rotation of the sprocket 97 will cause the film to be advanced frame by frame in a sequential manner independent of which way the sprocket 97 is rotated. When the sprocket is rotated in a clockwise direction as viewed in FIG. 12, the bottom of the length of film will be taken up. As this film is taken up, it will gradually urge the lower roller 121 away from the index plate 107 against the force of the spring 126. This continues until the film has been moved far enough away from the lower index pin 111 so that it will be released by both of the index pins 111. As soon as this occurs, the film 96 will be advanced until the next perforations 98 are in registration with the pins 111 and snap onto the pins by the force of the rollers 121. In this manner, the film is advanced by one frame. This frame remains stationary until the take up of the film again causes release of the film from the index pins 111 to cause the next frame to be advanced. Assuming rotation of the sprocket 97 in a clockwise direction as viewed in FIG. 16 during the time that the frames of the film are periodically advanced, the upper rum of the film is continuously being advanced towards the index plate. Also, during the time that this is occurring, the film is continuously being taken up. At all times the film 96 is kept under control. There is no difficulty in operating the crank in either direction to cause the film to be advanced in either direction across the aperture. The operation hereinbefore described is merely reversed.

During the time that film is being advanced in the viewer, ambient light is supplied to the back side of the film immediately adjacent the aperture so that sufficient illumination is provided to view the film. This light comes through the diffuser window 49 and then is bent through 90° to the film aperture. The operator, by utilizing the eye piece and by utilizing a relatively steady motion to operate the crank 42, can readily provide very good motion pictures.

Figure 24:
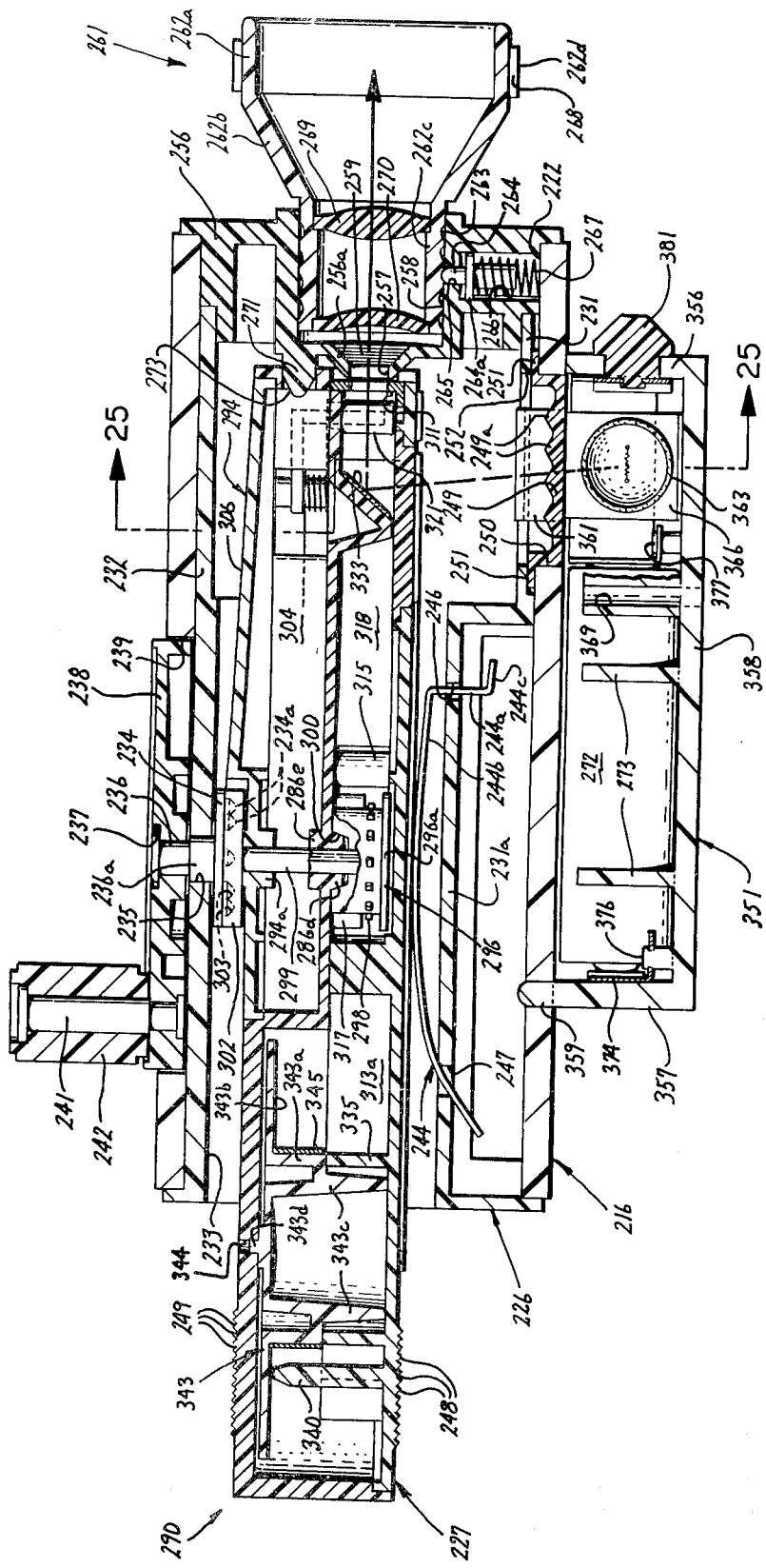
FIG. 24 is an enlarged cross-sectional view of the motion picture viewer shown in FIG. 22 with a cartridge in place.

Another embodiment of the motion picture viewer with removable cartridge is shown in FIGS. 17–34. As can be seen from the drawing, in many respects the viewer and the cartridge are similar to the viewer and cartridge hereinbefore described. The motion picture viewer 214 consists of a housing 216 which is generally rectangular in shape and is formed of an aluminum extrusion. The housing 216 consists of top and bottom walls 217 and 218, side walls 219 and 221, and front and rear open ends 222 and 223. A one-piece inner case 226 formed of a suitable material such as plastic is disposed within the housing 216. The inner case 226 is adapted to receive a film magazine or cartridge 227 of the type hereinafter described in detail. The inner case is provided with a top wall 228, bottom wall 229 and side walls 231 and 232. The side wall 231 is provided with a raised portion 231a extending the entire width of the side wall and extending approximately two-thirds the length of the side wall as can be seen particularly in FIG. 24. The side wall 232 is provided with a raised portion 232a which also extends the entire width of the side wall and approximately two-thirds the length of the side wall as also shown in FIG. 24. The portion 232a is formed with a recess 233 which extends longitudinally of the portion 232a and which is spaced equi-distant between the upper and lower extremities of the side wall portion 232a.

A disc-like drive member 234 is disposed within the recess 233 and is provided with integral, outwardly extending drive lugs or pins 234a which are spaced in a circle adjacent the outer margin of one side of the drive member 234. The drive member 234 is provided with an integral shaft 236 which is squared on its outermost end. The shaft 236 is provided with a boss-like portion 236a which serves as a bearing surface and which extends through a hole 235 provided in the side wall 232 of the inner case 226. The outer end of the shaft 236 extends into a square hole 237 provided in a crank 238. The crank 238 is disposed within a circular opening or hole 239 provided in the housing 216. The outer end of the shaft 236 is flattened as shown particularly in FIG. 24 to retain the crank disc on the shaft 236. A pin 241 is mounted adjacent the outer margin of the disc 238 and extends outwardly therefrom. A sleeve 242 is mounted on the pin. The sleeve 242 is provided with grooves 243 extending longitudinally of the sleeve and spaced circumferentially on the outer surface of the sleeve to permit easier gripping of the sleeve. It can be seen that the sleeve 242 and the pin 241 serve as a handle which, in combination with the disc 238, serve as crank means for rotating the drive member 234.

Spring means is provided for yieldably engaging the film cartridge or magazine 227 and urging it into engagement with the drive member 234 and consists of a metal leaf spring 244. One end of the leaf spring is provided with an L-shaped portion having one portion 244a extending at substantially right angles to the main portion 244b of the spring 244 and another portion 244c which extends at right angles to the portion 244a and is generally parallel to the portion 244b. This L-shaped end of the leaf spring is inserted through a hole 246 provided in the raised portion 231a of the side wall 231 so that the portion 244c will serve to retain that end of the spring within the hole 246. The leaf spring 244 is then flexed and the other end of the spring is inserted through a hole 247 also provided in the raised portion 231a of the side wall 231. From FIG. 24, it can be seen that the main portion 244b of the spring 244 is adapted to engage the side wall of the cartridge 227 to yieldably urge it towards the drive member 234.

A diffuser window 249 for permitting light to travel through the housing 216 and the inner case 226 to the cartridge 227 for a purpose hereinafter described is provided. It is formed of a suitable material such as a plastic and is mounted in an opening 250 provided in the side wall 222 of the housing 216. The window 249 is provided with a plurality of prism portions 249a of a type well known to those skilled in the art. The diffuser window 249 is provided with flanges 251 which extend over the side wall 222 and serve to prevent the window from falling outwardly through the opening 250. The window 249 is also in registration with an opening 252 in the side wall 231 of the inner case 226. The rear sides of the flanges 251 of the window 249 are engaged by flanges 253 provided on the inner case 226. The rear sides of the flanges 251 of the window 249 are engaged by the portion of the side wall 231 surrounding the window 252. A pair of elongate slots 254 are formed on the upper and lower portions of the window 249 as shown particularly in FIG. 22 for a purpose hereinafter described.

A front mounting plate 256 is mounted in the front opening 222 of the housing 216. The front mounting plate is formed of a suitable material such as plastic and is provided with a viewing aperture 257 which opens into a cylindrical bore 258 also provided in the front mounting plate. The aperture 257 is rectangular and is bounded by an inclined portion 256a. The outer surface of the inclined portion is provided with a plurality of very small grooves or recesses 259 which extend around the aperture 257 and which are provided for the purpose of reducing reflections from the outer surface of the inclined portion 256a (see FIGS. 23 and 24).

An eye piece assembly 261 is mounted in the bore 258. The eye piece assembly 261 consists of an eye piece 262 which is provided with a cylindrical portion 262a, an inwardly tapered portion 262b and a cylindrical portion 262c. The cylindrical portion 262c is provided with helical threads 263 which are adapted to be engaged by a pin 264 that extends through a hole 265 and is adapted to engage the threads 263 as shown in FIG. 24. The pin is provided with a flanged portion 264a which seats in a well 266 formed in the mounting plate 256. A spring 267 is mounted in the well and is seated on the pin 264 and has one end engaging the flanged portion 264a and has the other end engaging the wall 219 of the housing 216. In this way it can be seen that the eye piece can be adjusted inwardly and outwardly of the bore 258 and retained in the desired position by the spring-urged pin 264. The eye piece 262 is also provided with a raised annular portion 262d which is provided with a plurality of longitudinally extending slots 268 spaced circumferentially on the raised portion 262d to facilitate grasping and rotating of the eye piece 262 to adjust the position of the same. A pair of lenses 269 and 270 are mounted in spaced apart positions within the circular portion 262c of the eye piece 262 as shown in FIG. 24 and serve to form a lens assembly. By adjustment of the eye piece 262, it is possible for the user to adjust the eye piece so that the image on the film in the cartridge 227 is in proper relationship with respect to the eye of the viewer.

The front mounting plate 256 is provided with an integral ear or registration pin 271 which is adjacent one side of the aperture 257. Registration pin 271 is provided with an inclined or conical surface 273 to facilitate positioning of the magazine or cartridge 227 so as to precisely position the magazine or cartridge 227 with respect to the viewing aperture 257.

In assembling the viewer, the inner case 226 is slipped into the rear open end 223 of the housing 216 and the mounting plate 256 is pressed into the front open end 222 of the housing 216. The inner case 226 and the mounting plate 256 then can be fastened together in a suitable manner such as by the use of ultrasonic welding.

A combination stand and hand grip 276 is mounted upon the housing 216 and is provided with an elongate base 277, a vertical pedestal 278 and a mounting block 279 formed integral with the pedestal. The stand and hand grip 276 can be formed of a suitable material such as plastic. The block 279 is provided with a raised portion (not shown) which extends through a hole in the housing 216 (not shown) and which is adapted to be bonded to the inner case 226 by suitable means such as ultrasonic bonding.

The film cartridge or magazine 227 is formed of a suitable material such as plastic and is provided with a rear side wall 286 which is formed in two portions 286a and 286b in which portion 286a is spaced equi-distant the sides of the top wall 287 and the bottom wall 288, whereas the portion 286b is adjacent the outer margin of the front end wall 289 and the rear end wall 291. The portions 286a and 286b are joined by a portion 286c which extends at right angles thereto. The portion of the cartridge 227 thus far described forms a case 290 which has an open front side and which has an opening at the rear side substantially the same size as the portion 286a. A front cover 292 is mounted on the front side and is provided with a pair of spaced ears on each end of the same. By flexing the cover 292, the ears 293 are adapted to be inserted in slots 294 provided in the end walls 289 and 291 of the case to hold the front cover in place. A rear cover 294 is provided and is mounted in the rear opening and is secured to the case by suitable means such as cement.

A length of film 96 is adapted to be disposed within the cartridge 227 and is of the type hereinbefore described and is provided with perforations 295 extending longitudinally of the film along one side of the film. A sprocket 296 is mounted within the cartridge 227 and is provided with teeth 298 which are adapted to engage the perforations 295 in the film. A flanged hub 298a is mounted in the sprocket. Both the flanged hub 298a and the sprocket 296 are mounted upon a squared end of a shaft 299 (see FIG. 31). The shaft 299 extends through a raised boss-like portion 286d provided on one side of the wall portion 286a and another boss-like portion 286e provided on the other side of the wall portion 286a. The boss-like portion 286d is provided with a taper as shown which is adapted to mate with a conical recess 300 provided in the sprocket 286. This ensures that the sprocket will be exactly aligned within the cartridge and with respect to the other parts of the cartridge as hereinafter described. The shaft 299 extends through a boss-like portion 294a provided on the rear cover 294 and is secured to a circularly driven disc 302. A plurality of circular holes 303 which serve as recesses are provided in the driven disc 302 and are spaced in a circle adjacent the outer margin of the outer surface of the disc 302. A pair of spaced parallel ribs 304 are formed integral with the wall portion 206a and extend outwardly at right angles therefrom and are parallel to the top wall 287 and the bottom wall 238. These ribs 304 are of such height so that they serve as a support for the rear cover 294. The rear cover 294 is provided with a pair of spaced parallel ribs 305 formed integral with the rear cover 294 and, as can be seen from FIG. 31, extend at right angles to the ribs 304 and engage the ribs 304 to provide the support for the rear cover. The rear cover is, in addition, provided with an inclined ramp 306 (see FIGS. 30 and 31) which is formed integral with the rear cover 294 and which is inclined outwardly from the front to the rear of the rear cover and has its uppermost extremity generally flush with the outer surface of the driven disc 302 for a purpose hereinafter described.

The film 96 is moved past an aperture 397 provided in an index plate 308 that is secured to the front wall 289 by suitable means such as cement. The index plate 208 is provided with a rearwardly extending flange portion 308a which serves as a film guide and guides one edge of the film as it passes the aperture 307. An opening 309 is provided on the front wall 289 to permit viewing of the film appearing in the aperture 307. Means is provided for arresting the film during its travel past the aperture 307 and consists of a pair of triangularly-shaped pins 311 mounted above and below the aperture 307 adjacent the flange portion 308a. The index plate 308 is provided with a registration tab portion 308b which is adapted to seat in a recess 312 provided in the side wall portion 286a.

Film guiding means is provided within the case 290 for retaining and guiding the film and consists of a generally circular guide member 313 which is formed integral with the case 290 and which is provided with outwardly extending inclined portions 313a which form an exit opening 314 through which the film can travel as it passes over the sprocket 296. Two pairs of rollers 315 mounted on pins 316 formed integral with the wall portion 286a extending outwardly therefrom are provided on opposite sides of the sprocket 296 and are positioned such that the inwardly facing surfaces of each pair of the rollers 315 are spaced apart a distance which is slightly less then the diameter of the sprocket 296. As can be seen, one pair or two of the rollers 315 are positioned adjacent the openings 314 adjacent the portions 313a. Upper and lower arcuate guide members 317 formed integral with the side wall portion 286a and extending outwardly therefrom are positioned immediately above and below the sprocket 296 so that there is a relatively small clearance between the sprocket and the guide members. As can be seen from FIG. 31, the guide members have a height which is substantially less than the height of the sprocket 296 so that they are spaced from the sprocket teeth 289. Additional upper and lower inclined film guide members 318 are provided which are formed integral with the side wall portion 286a and have their innermost extremities terminating adjacent the rollers 315 and form an opening 319 for passage of the film 96. It will be noted that the rollers 315 are positioned in such a manner that the film 96 travels generally out of contact with the portions 313a and the guide members 317 and the guide members 318 as can be seen particularly from FIG. 32.

Means is provided for retaining the film 96 in relatively close proximity to the index plate 308 and the aperture 307 in the index plate and consists of a pair of rollers 321 positioned above and below the index plate. The rollers 321 are rotatably mounted upon pins 322 which extend through arcuate slots 323 provided in the side wall portion 286a so that the rollers 321 are disposed between the side wall portion 286a and the front cover 292 to retain the rollers 321 on the pins 322. The pins 322 are formed integral with arms 324 that are pivotally mounted on pins 326 which are formed integral with the side wall portion 286a. The arms 324 are retained on the pins 326 by the rear cover 294. Coil springs 327 are mounted on hub-like portions 324a of the arms 324 and have one end engaging the associated wall and the other end engaging the associated pin 322 to yieldably urge the pins 322 and the rollers carried thereby toward the front end wall 289.

Means is provided for utilizing light which is admitted into the motion picture viewer through the window 249 and directing it onto the film 96 which is in the aperture 307. This means consists of a raised triangular member 331 which is formed integral with the side wall portion 286a between cut-cuts 332 provided in the ribs 304. This raised member 331 is provided with a portion 331a which is inclined at a predetermined angle as, for example, an angle of 45° with respect to the side wall portion 286a and with respect to the film in the aperture 307. A reflecting surface 333 is provided on the portion 331a and consists of suitable means such as aluminum foil cemented to the portion 331a. A window 334 formed of a suitable material such as plastic is mounted in the front cover 292 so that when the front cover 292 is mounted upon the case 290, light passes from the window 249 in the housing through the window 334 and thence onto the reflecting surface 333 where it is reflected directly onto the film in the aperture 307. It should be appreciated that the window 334 is only required when the cartridge is formed of an opaque material.

The circular guide member 313 provided in the case 290 cooperates with film guiding means carried by one end of the front cover 292. This film guiding means takes the form of a centrally disposed fixed spool or cylinder 335. A guide member 336 extends tangentially therefrom toward the slot 314 and is also formed integral with the cover 292. An additional J-shaped guide member 337 is formed integral with the cover 292 and cooperates with the cylinder 335 and the guide member 336 to provide a path 338 for receiving the film after it has been viewed. Reinforcing ribs 339 are formed integral with the cover and the member 337 to support the member 337. A separating pin 340 is formed integral with the J-shaped member 337 and extends outwardly at right angles from the front cover 292. The pin 340 serves as a lower guide and keeps the first inner loop of the film roll separated from the remainder of the film roll 96. An additional curved guide member 341 is formed integral with the cover and joins the guide member 336 at a point 342 which is utilized for separating the film runs. The guide member 341 is provided with an arcuate extension 341a between the ends of the game which serves as a lower guide and is adapted to extend between the first outer loop of the film roll 96 and the remainder of the roll of film. The reinforcing ribs 339 are formed integral with the guide member 341 and serve to reinforce the guide member 341. As can be seen from FIG. 32, the guide member 341 in cooperation with the circular guide 313 serves to guide the film as it is removed from the film roll for passage through the cartridge to be viewed. A roller or spool 343 is rotatably mounted in the circular guide member 313. The roller 343 has a central cylindrical portion 343a, a flanged portion 343b and a central tapered hub portion 343c. The hub portion 343a is disposed within the cylinder 335 so that the cylinder 335 supports one end of the spool for rotational movement. The spool 343 is provided with a tit portion 343d which seats in a hole 344 in the wall portion 286b to thereby provide support for the other end of the spool 343. A piece of tape 345 formed of a suitable friction producing material such as masking tape is secured about the cylindrical portion 343a and serves to prevent the film roll 96 from slipping on the cylindrical portion 343a.

A registration hole 346 is provided in the front wall 289 of the cartridge and is adapted to mate with the registration pin 271 formed on the viewer. The outer surface of the front cover 292 is provided with vertically extending ribs 348 and similarly the case 290 is provided with vertically extending ribs 349 on the outer surface of the same. The ribs 348 and 349 are formed on the rear of the cartridge and facilitate grasping of the cartridge by the fingers. Vertical ribs 350 are provided on the inside of the front cover 292 to prevent the sprocket 296 from rubbing on the cover 292. Horizontal ribs 355 are provided on the outside of the front cover 292 and serve as wear ribs for the leaf spring 244 and also serve to reduce friction.

Operation and use of the motion picture viewer with a removable cartridge or magazine of the type shown in the figures beginning with FIG. 17 is very similar to the use hereinbefore described in conjunction with the previous embodiment. Normally, the cartridge is supplied to the user with the film 96 mounted in the cartridge in the manner indicated in FIG. 32 in the form of a continuous loop so that the film can be viewed continuously if desired.

The user places such a cartridge 227 in a viewer merely by pushing the same into the cartridge as far as it can go. The registration pin 271 meets with the hole 346 to properly position the cartridge with respect to the eye piece assembly 261 of the viewer. During the time that the cartridge is being inserted into the viewer, the ramp 306 serves to cam the cartridge 227 away from the side wall 232 against the force of the spring 244 so that the driven member 302 can move over the top of the drive member 234 and mate therewith as the cartridge is advanced to its home position in the viewer. During the final movement of the cartridge in the viewer, the registration pin 271 mates with the hole 346 in the cartridge to precisely position the aperture 307 of the cartridge with the eye piece assembly 261. It can be seen that the cartridge is made in such a manner that the user cannot insert the cartridge improperly into the viewer.

After the cartridge has been inserted, the user of the viewer can then grasp the stand 276 by one hand and operate the handle 242 with the other hand to rotate the film in either a clockwise or counter-clockwise direction. As explained in the previous embodiment, rotation of the handle will cause the film to be advanced frame by frame in front of the eye piece assembly 261 to give the effect of motion pictures.

If the viewer is being utilized out of doors or in a brightly lit room, sufficient light will be admitted through the windows 249 and 342 and reflected by the surface 343 onto the back side of the film to illustrate the portion of the film in the aperture 307. This permits the user of the viewer to view motion picture film without the use of any auxiliary power. The user merely operates the crank to obtain a movement of the motion picture film and the necessary light is supplied as hereinbefore described.

In the event there is insufficient ambient light to utilize the viewer if it is desired to utilize the viewer in a dark room, an auxiliary light source 351 can be provided. This auxiliary light source is shown particularly in FIGS. 26, 27 and 28 and consists of a case 352 formed of a suitable material such as plastic. The case is formed by top and bottom walls 353 and 354, and walls 356 and 357, and a side wall 358. The case 352 is provided with a locating pin 359 which is mounted on the wall 357 and a pair of hook-like members or clips 361 formed integral with the walls 353 and 354. The hook-like members 361 are adapted to be inserted in slots 254 provided in the window 249 of the viewer. The alignment pin 359 is adapted to seat in a hole 362 provided in the side wall 219 of the viewer. An incandescent lamp 363 is mounted within the case 352. The lamp is mounted in a socket 364 and carried by a clip 366. The clip 366 is removably held in place between the wall 353 and a lug 367 which is formed integral with the side wall 353. The clip 366 is provided with an extension 366a which is adapted to be engaged by one terminal of a battery 368 mounted within the case. The clip is also provided with an additional extension 366b which is at right angles to the extension or portion 366a. The portion 366b is adjacent a hole 369 provided in the case which is adapted to receive one terminal of a two-terminal plug as hereinafter described. The other hole for receiving the other terminal of the two-terminal plug is hole 371 also provided in the side wall 358 of the case. Reinforcing portions 358a are provided integral with the side wall 358 on one side of each of the holes 369 and 371. Another battery 372 is mounted within the case 352. The two batteries 368 and 372 are separated by dividers 373 which are formed integral with the side wall 358. The other end of the divider 368 is engaged by a clip 374 formed of a conducting metal which is secured to a lug 376 formed integral with the one side wall 358. The clip 374 engages both of the batteries 368 and 372 and serves to connect them in series. The other end of the battery 372 is engaged by a metal clip 376 which is mounted upon a pair of lugs 377 formed integral with the side wall 358. The clip 376 is provided with an extension 376a disposed adjacent the wall 356 which is adapted to be slidably engaged by a contact element 378. The contact element 378 is formed of metal and is mounted on a pair of lugs 379 formed on a slide switch 381 slidably mounted in the end wall 356. The switch 291 is preferably formed of a translucent colored material such as a red plastic so that when the lamp 368 is lit, light will pass through an opening 382 in the end wall 356 and illuminate the switch to indicate that the auxiliary light source is on. The contact element 378 is provided with an extension 378a which is adapted to be moved by the switch 381 into engagement with the other contact 383 of the lamp 363. Thus, it can be seen that the lamp 363 can be lit merely by actuation of the slide switch 381 to energize the lamp from the batteries 368 and 372. A member 384 is mounted within the case 352 and is provided with a reflecting surface 386, a portion of which is behind the lamp 363 (see FIG. 25) and another portion below the same which is inclined at an angle of 45° to direct the light from the lamp through the window 249 and thence through the window 334 onto the reflecting surface 333 and thence onto the film.

From the drawings it can be seen that the auxiliary light source 351 is relatively compact and can be readily mounted on the viewer when desired. It also can be easily removed from the viewer when there is sufficient ambient light to permit operation of the viewer. The auxiliary light source 351 is mounted on the viewer on the opposite side on which the handle 242 is mounted so that it is in an out-of-way position.

Figure 26:
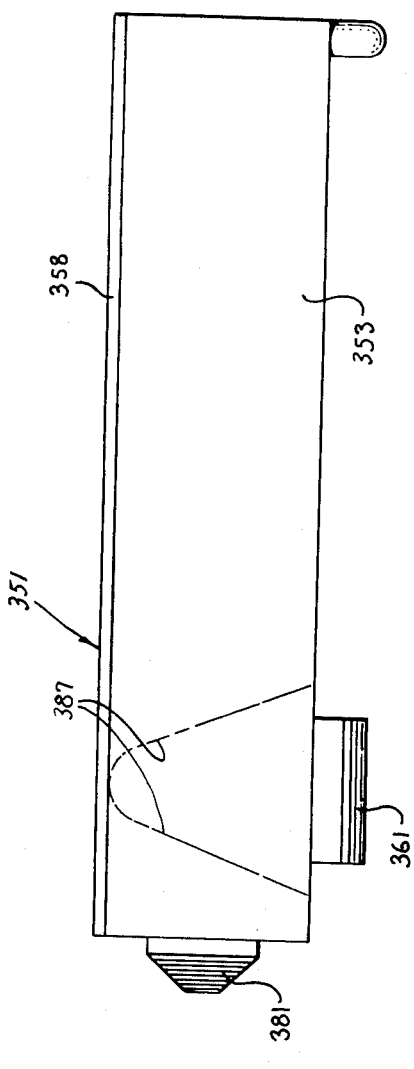
FIG. 26 is a top plan view of the light source pack.
Figure 27:
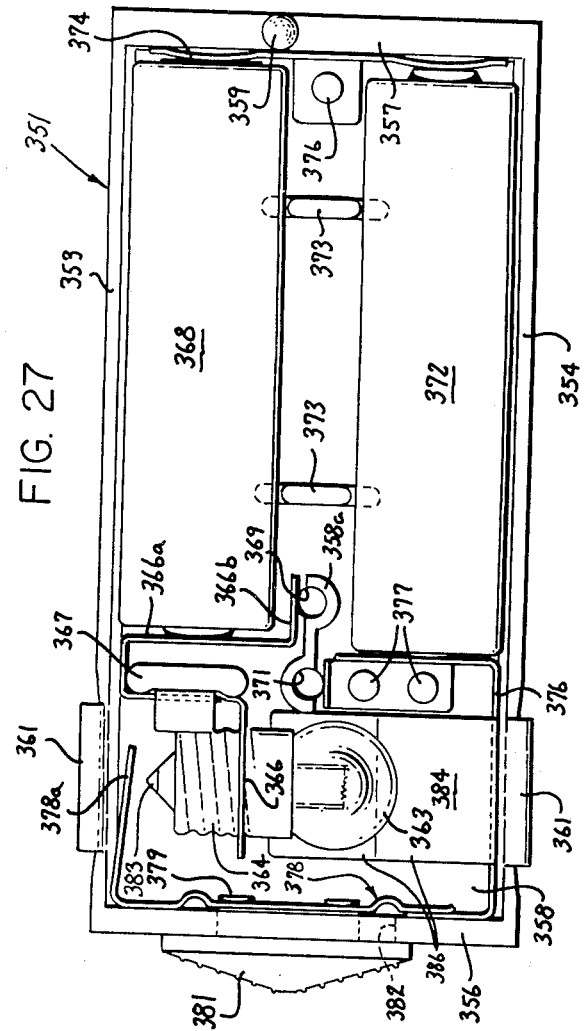
FIG. 27 is a cross-sectional view of the light source pack shown in FIG. 26.
Figure 28:
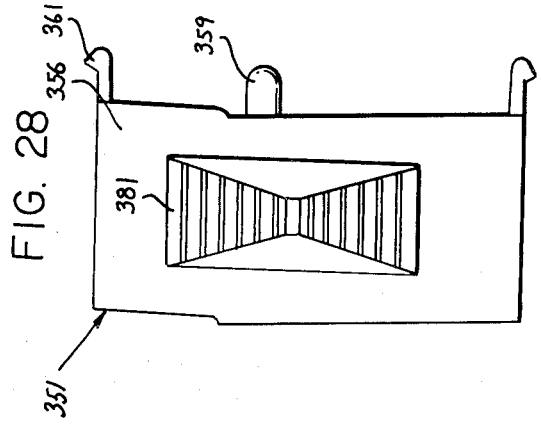
FIG. 28 is a front elevational view of the source pack shown in FIGS. 26 and 27.
Figure 31:
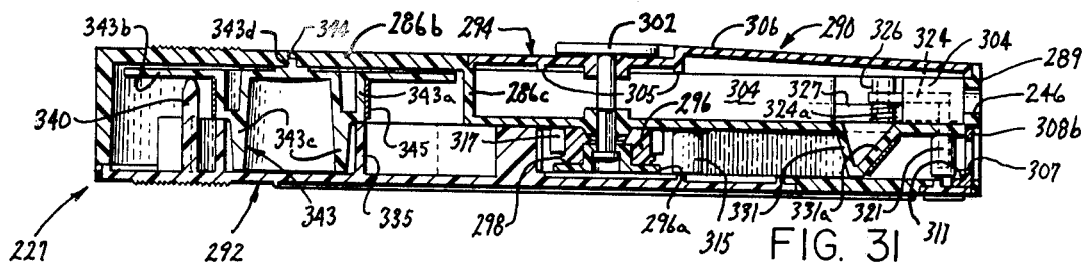
FIG. 31 is a cross-sectional view of the cartridge.
Figure 32:
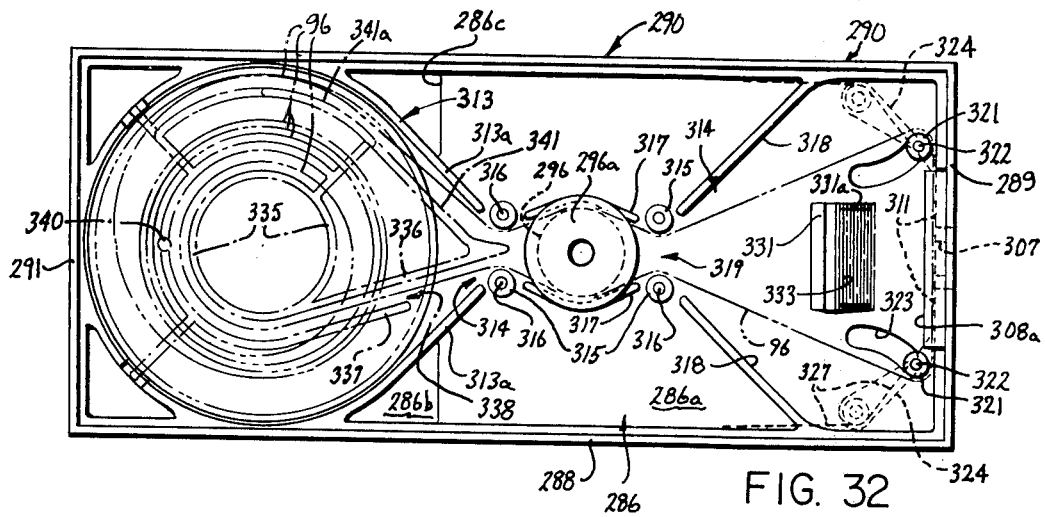
FIG. 32 is a view showing the case utilized in the cartridge.
Figure 33:
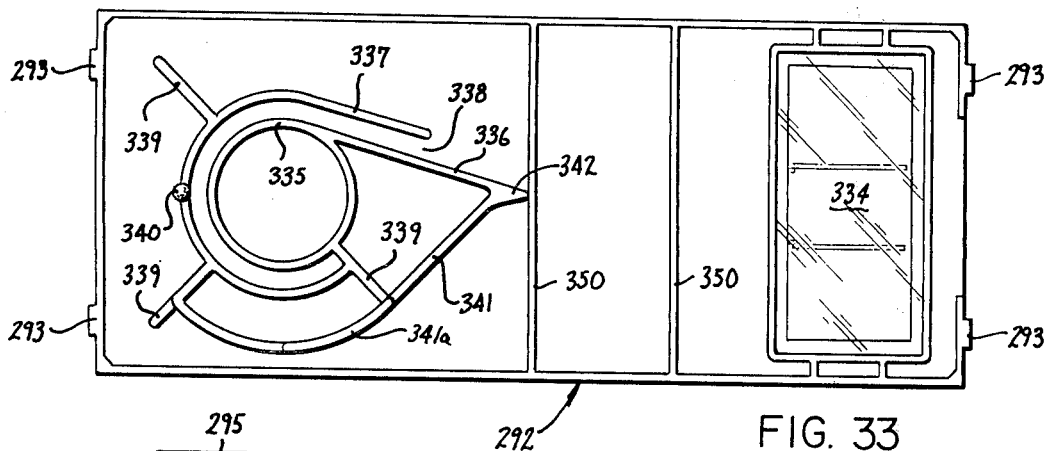
FIG. 33 is a view showing the cover utilized in the cartridge.
Figure 34:
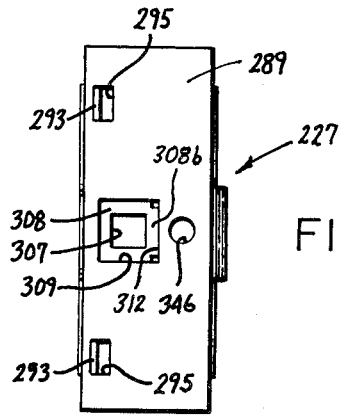
FIG. 34 is a front elevational view of the cartridge shown in FIG. 31.

The V-shaped broken line 387 shown in FIG. 26 indicates an area of lesser thickness which can be flexed to permit the hook or clip-like portions 361 to be bent so that they can be inserted and removed from the slots 254.

In the event that a source of electrical power is readily available and it is desired to conserve the batteries 368 and 372, a conventional plug 389 is utilized. This plug 389 is of a conventional male type and is adapted to be inserted in conventional 110 volt a.c. outlets. The plug is provided with a transformer which is integral therewith which reduces the voltage from 110 to 120 volts to a suitable voltage such as 2.6 volts. This reduced voltage is supplied on a cord 391 to a plug 392 which is provided with a pair of terminals 393 which are adapted to be inserted in the holes 369 and 371 provided in the case 352 and which are adapted to engage the extension 366b of the clips 366 and the clip 376 to supply the necessary power to energize the lamp 363.

Thus, it can be seen that the auxiliary source of power can be supplied either from batteries or from a conventional 110 volt a.c. power supply.

With the foregoing apparatus it can be seen that the motion picture viewer can be utilized outdoors with ambient light or indoors where there is insufficient light by the use of an auxiliary light source which can be powered either from batteries or 110 volts a.c.

It has been found that the motion picture viewer is particularly useful for short lengths of film which can be utilized for depicting certain specialized features. For example, such motion picture viewer can be readily utilized for the teaching of sports such as baseball, golf and tennis. The operator, by merely reversing the direction of rotation of the crank, can repeat any portion of the sequence as much as possible. The eye piece assembly is constructed so that it can be readily adjusted to focus the same. The cartridge can be readily removed and another cartridge put in its place. Thus, each cartridge can contain film depicting only one aspect of a sport, i.e., how to bunt in baseball.

The operation of the viewer is relatively quiet so it does not disturb the operator during the time he is operating the same. The viewer is relatively compact so that it can be held in one hand and operated by the other hand. In addition, it is constructed in such a manner that it can be constructed of relatively inexpensive parts.

We claim:

1. A cartridge for use in apparatus of the type having a housing for receiving the cartridge, reversible driving means for the cartridge and an optical assembly, said cartridge being adapted to receive a length of perforated film, said cartridge comprising means forming a framework having indexing means, said indexing means having an aperture substantially in alignment with the optical assembly when the cartridge is disposed in the housing, means for storing said length of perforated film in said cartridge, guide means in said cartridge for guiding said film along said indexing means past said aperture, said indexing means including a pair of index members spaced from each other in the direction of film travel and adapted to engage the perforations in the film, a pair of film engaging members mounted in said cartridge in a spaced relationship with respect to each other along the direction of film travel and adjacent said index members, said film engaging members urging said film against said indexing means whereby said index members engage the perforations in the film so that the film is selectively advanced on a frame by frame basis past the aperture, said film having upper and lower runs, a single drive sprocket for engaging the upper and lower runs of the film for causing movement of the film within the cartridge, said upper run overlying the lower run at the drive sprocket, means carried by the cartridge for driving the drive sprocket and adapted to be engaged by the reversible driving means in the housing, and upper and lower pairs of film guiding rollers mounted in fixed positions in said framework on opposite sides of the drive sprocket and spaced away from and out of engagement with the drive sprocket and engaging the upper and lower runs of the film, said film guiding rollers being accessible from one side to permit the film to be inserted into engagement with the drive sprocket, said film guiding rollers being positioned so that one roller of each pair is positioned rearwardly away from the drive sprocket and the other roller of each pair is positioned forwardly away from the drive sprocket to form front and rear pairs of rollers so that there is a space between imaginary lines extending through the centers of rotation of the front and rear pairs of rollers and the outer surface of the drive sprocket, said film guiding rollers also being positioned so that imaginary lines tangent to the outer surfaces of the upper and lower pairs of rollers will extend through the drive sprocket.

2. A cartridge as in claim 1 wherein said single drive sprocket serves as the sole means for causing movement of said film.

3. A cartridge as in claim 1 together with means for receiving light and for directing light through the film in front of the aperture.

4. A cartridge as in claim 1 wherein said film engaging members include pins carried in the cartridge and rollers rotatably mounted on the pins and engaging the film.

5. A cartridge as in claim 1 together with guide means including upper and lower arcuate guide members disposed above and below the drive sprocket and between the upper and lower pairs of rollers.

* * * * *